United States Patent
Furuta et al.

(10) Patent No.: US 7,281,370 B2
(45) Date of Patent: Oct. 16, 2007

(54) FAN REVOLUTION SPEED CONTROL METHOD

(75) Inventors: Hideto Furuta, Tokyo (JP); Kazushige Okamoto, Tokyo (JP); Noriyuki Adachi, Tokyo (JP)

(73) Assignee: Shin Caterpillar Mitsubishi Ltd., Tokyo (JP)

( * ) Notice: Subject to any disclaimer, the term of this patent is extended or adjusted under 35 U.S.C. 154(b) by 119 days.

(21) Appl. No.: 10/518,606

(22) PCT Filed: Mar. 18, 2004

(86) PCT No.: PCT/JP2004/003691

§ 371 (c)(1),
(2), (4) Date: Aug. 16, 2005

(87) PCT Pub. No.: WO2005/026509

PCT Pub. Date: Mar. 24, 2005

(65) Prior Publication Data

US 2006/0062678 A1    Mar. 23, 2006

(30) Foreign Application Priority Data

Sep. 11, 2003   (JP)   ............................. 2003-319834

(51) Int. Cl.
F04B 49/00    (2006.01)
F04B 17/00    (2006.01)
(52) U.S. Cl. ............................ 60/329; 60/420; 60/428; 60/431; 60/456
(58) Field of Classification Search .................. 60/329, 60/420, 428, 431, 456
See application file for complete search history.

(56) References Cited

U.S. PATENT DOCUMENTS

| | | | | |
|---|---|---|---|---|
| 4,798,050 A | * | 1/1989 | Nakamura et al. | ............ 60/329 |
| 5,251,440 A | * | 10/1993 | Bong-dong et al. | .......... 60/329 |
| 5,564,274 A | * | 10/1996 | Denbraber et al. | ........... 60/329 |

FOREIGN PATENT DOCUMENTS

| | | |
|---|---|---|
| JP | 5-45207 | 6/1993 |
| JP | 11-294164 | 10/1999 |
| JP | 2000-110560 | 4/2000 |
| JP | 2002-023791 | 1/2002 |

OTHER PUBLICATIONS

Patent Abstracts of Japan for JP2000-110560 published on Apr. 18, 2000.
Patent Abstracts of Japan for JP11-294164 published on Oct. 26, 1999.
Patent Abstracts of Japan for JP2002-023791 published on Jan. 25, 2002.
Patent Abstracts of Japan for JP5-45207 published on Jun. 18, 1993.

* cited by examiner

*Primary Examiner*—Igor Kershteyn
(74) *Attorney, Agent, or Firm*—Darby & Darby

(57) ABSTRACT

Temperature of each cooling target fluid is detected. When the flow rate of a cooling target fluid passing through a cooling system is high, the fan revolution speed of a cooling fan of the cooling system is controlled to achieve a target fan revolution speed so that the detected temperature of the cooling target fluid reaches a preset target temperature. In cases where the engine is in a low idling state, the flow rate of each cooling target fluid passing through the cooling system is reduced. The fan revolution speed of the cooling fan is controlled to achieve a new target fan revolution speed that is lower than the target fan revolution speed.

3 Claims, 6 Drawing Sheets

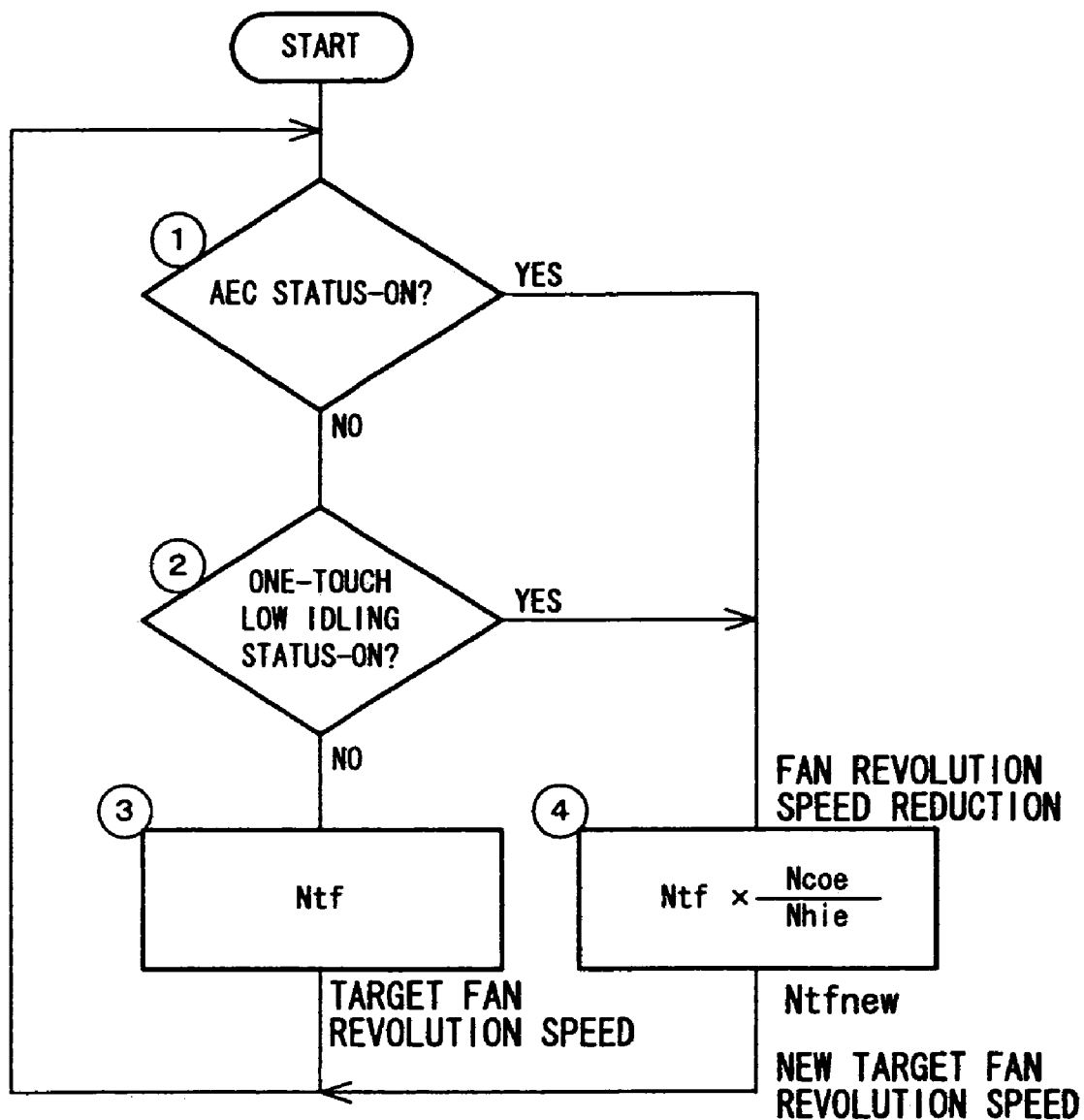
F I G. 1

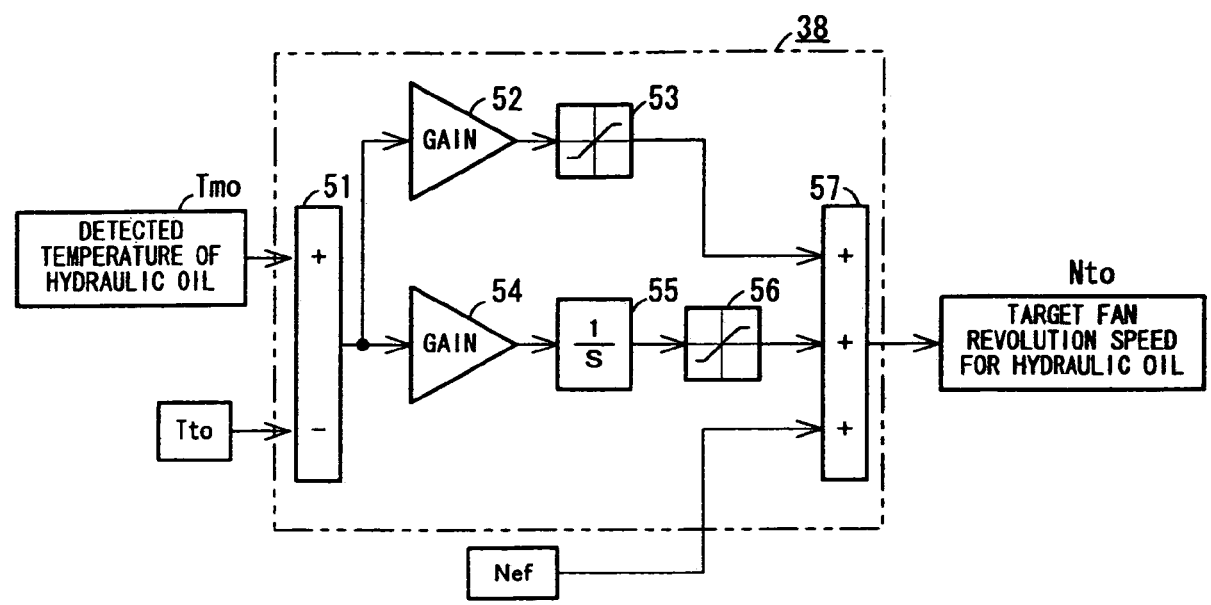
F I G. 4

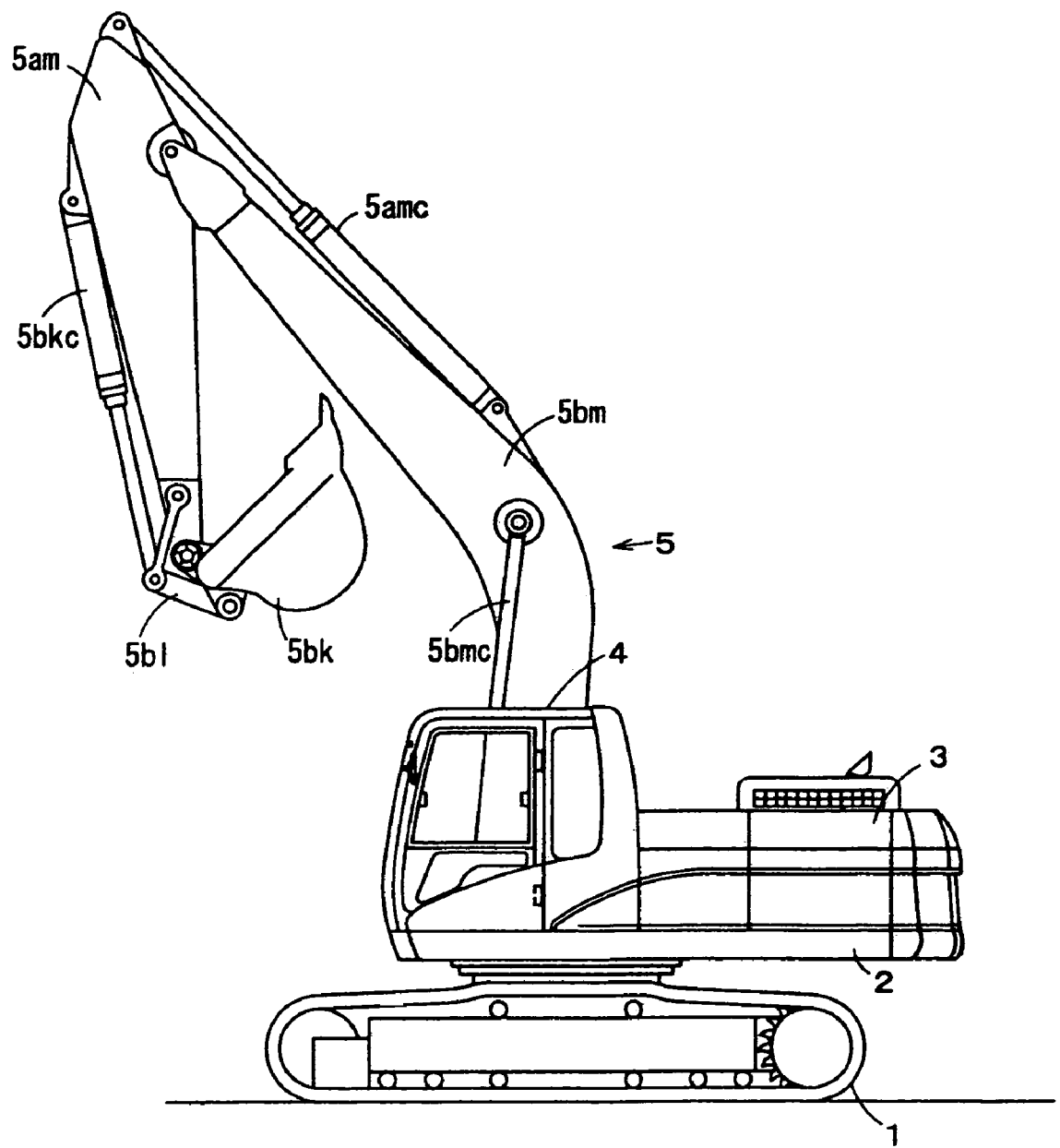
F I G. 5

FAN REVOLUTION SPEED CONTROL METHOD

CROSS-REFERENCE TO PRIOR APPLICATION

This is a U.S. National Phase application under 35 U.S.C. §371 of International Patent Application No. PCT/JP2004/003691 filed Mar. 18, 2004, and claims the benefit of Japanese Patent Application No. 2003-319834 filed Sep. 11, 2003 which is incorporated by reference herein. The International publication has not published as of the date of filing of this application.

TECHNICAL FIELD

The present invention relates to a fan revolution speed control method for controlling fan revolution speed of a cooling fan of a cooling system. The aforementioned revolution speed system a number of revolutions per unit period of time and is hereinafter referred to simply as "revolution speed".

BACKGROUND OF THE INVENTION

An engine for driving pumps is provided with a main pump and a fan pump. The main pump is for excavation or other work and serves to drive a working unit system and a turning system of a hydraulic shovel. The fan pump serves to perform variable control of the pump discharge rate of a fan pump by system of an electro-hydraulic transducing valve so as to control the revolution speed of the fan motor that is adapted to drive a cooling fan for cooling an intake air cooler, an oil cooler, and a radiator. Through the control of the revolution speed of the fan motor, the fan pump serves to control the fan revolution speed of the cooling fan. The electro-hydraulic transducing valve is controlled by a controller. Temperature sensors respectively detect temperatures of the intake air, the hydraulic oil, and the coolant, all of which are cooled by the cooling fan. The controller serves to control the fan revolution speed of the cooling fan by controlling the flow rate of the hydraulic oil fed from the fan pump so that the detected temperatures are brought to the same level as the respective target temperatures that have been set beforehand (refer to Japanese Patent No. 3295650 as an example).

Japanese Patent No. 3295650 mentioned above describes an automatic engine speed control system (hereinafter referred to as "AEC") for automatically reducing the engine speed to a given, low revolution speed and a one-touch low idling switch to be operated by an operator with a single operation so as to put the engine in the one-touch low idling state, in which the engine speed is controlled at a given, low speed. When the levers are at the neutral position, the hydraulic actuators are prevented from being operating. Should the engine be in either one of the aforementioned two states when the levers are at the neutral position, i.e. the AEC state when AEC is on or the one-touch low idling state, the engine speed is lower than in cases where the working unit is in operation. Regardless of the reduction in the engine speed, however, there is virtually no decrease in the fan speed, because the controller controls the fan revolution speed of the cooling fan by controlling the pump discharge rate of the fan pump so as to bring the detected temperature of each cooling target fluid, such as the hydraulic oil, to the same level as each respective target temperature determined beforehand. In other words, there is virtually no decrease in the amount of cooling air.

To summarize, the controller is adapted to control the fan revolution speed of the cooling fan by controlling the pump discharge rate of the fan pump so as to bring the detected temperature of each cooling target fluid, such as the hydraulic oil, to the same level as each respective target temperature determined beforehand. Therefore, when the detected temperature of a cooling target fluid, such as the hydraulic oil, is high, the controller controls the fan revolution speed of the cooling fan at a high speed.

Should the levers be returned to the neutral position during heavy load operation, the controller reduces the engine speed by system of either the AEC control or the one-touch low idling control while controlling a capacity changing system, such as a swash plate, of the variable delivery pump that serves to feed the hydraulic oil to the hydraulic actuators, thereby reducing the pump discharge rate of the variable delivery pump. As a result, the flow rate of the hydraulic oil fed to the hydraulic actuators is reduced sharply, resulting in sharp decrease of the flow rate of the oil returned to the tank from the hydraulic actuators through the oil cooler.

This may cause thermal strain resulting from the hydraulic oil in the oil cooler being rapidly cooled by the cooling fan rotating at a high speed to cope with the high temperature of the hydraulic oil. Such thermal strain presents the possibility of breakage of or other damage to the oil cooler.

In order to solve the above problems, an object of the invention is to provide a fan revolution control method that is capable of improving the durability of a cooling system provided with a cooling fan by reducing thermal strain that occurs in such cooling system.

DISCLOSURE OF THE INVENTION

A fan revolution speed control method according to the present invention calls for detecting a temperature of a cooling target fluid and controlling the fan revolution speed of a cooling fan of a cooling system for cooling the cooling target fluid so that when the flow rate of the cooling target fluid passing through the cooling system is high, the fan revolution speed of the cooling fan is controlled to achieve a target fan revolution speed in order to bring the detected temperature to the same level as a preset target temperature, and that when the flow rate of the cooling target fluid becomes lower, the fan revolution speed of the cooling fan is controlled to achieve a new target fan revolution speed that is lower than the target fan revolution speed. Should the flow rate of a cooling target fluid or fluids passing through the control system be reduced, the fan revolution speed of the cooling fan is controlled to achieve the new target fan revolution speed, which is lower than the target fan revolution speed. As this prevents rapid cooling of the cooling target fluid(s) flowing in the cooling system at a reduced flow rate and thereby suppress occurrence of thermal strain in the cooling system, the durability of the cooling system is improved.

A fan revolution speed control method according to another feature of the invention calls for detecting a temperature of hydraulic oil in a hydraulic circuit and controlling the fan revolution speed of a cooling fan of an oil cooler that serves to cool the return oil from a hydraulic actuator so that when a lever for feeding hydraulic oil to the hydraulic actuator is being operated, the fan revolution speed of the cooling fan is controlled to achieve a target fan revolution speed in order to bring the detected temperature to the same level as a preset target temperature, and that when the lever is at a neutral position, during which period supply of the hydraulic oil to the hydraulic actuator is at standstill, the fan revolution speed of the cooling fan is brought to a new target fan revolution speed that is lower than the target fan revolution speed. As described above, the new target fan revolution speed for the period during which the lever is at the neutral position is lower. Therefore, even when the hydraulic oil is flowing in the oil cooler at a reduced flow rate as a result of operating the lever to the neutral position, the method described above is capable of preventing rapid cooling of the hydraulic oil in the oil cooler and suppressing occurrence of thermal strain in the oil cooler, resulting in the improved durability of the oil cooler.

A fan revolution speed control method according to yet another feature of the invention is similar to the fan revolution speed control method described above and further characterized in that when reducing the engine speed of a pump driving engine in the hydraulic circuit for the period during which the lever is at the neutral position to a level lower than that for the period during which the lever is being operated, the new target fan revolution speed for the period during which the lever is at the neutral position is calculated by multiplying the fan revolution speed at that time by the ratio of the engine speed for the period during which the lever is at the neutral position to the engine speed for the period during which the lever is being operated. Therefore, when the lever is at the neutral position, the new target fan revolution speed for the period with the lever at the neutral position is calculated by reducing the target fan revolution speed to achieve the ratio of the engine speed when the lever is at the neutral position to the engine speed when to the lever is operated. As a result, the fan revolution speed can be reduced to the optimal level without the problem of excessive reduction of the fan revolution speed.

BRIEF DESCRIPTION OF THE DRAWINGS

FIG. 1 is a flow chart showing a fan revolution control method according to an embodiment of the present invention;

FIG. 4 is a block diagram showing the structure of a PI control unit for the control method;

FIG. 5 is a side view of a hydraulic excavator; and

PREFERRED EMBODIMENT OF THE INVENTION

Figure 2:
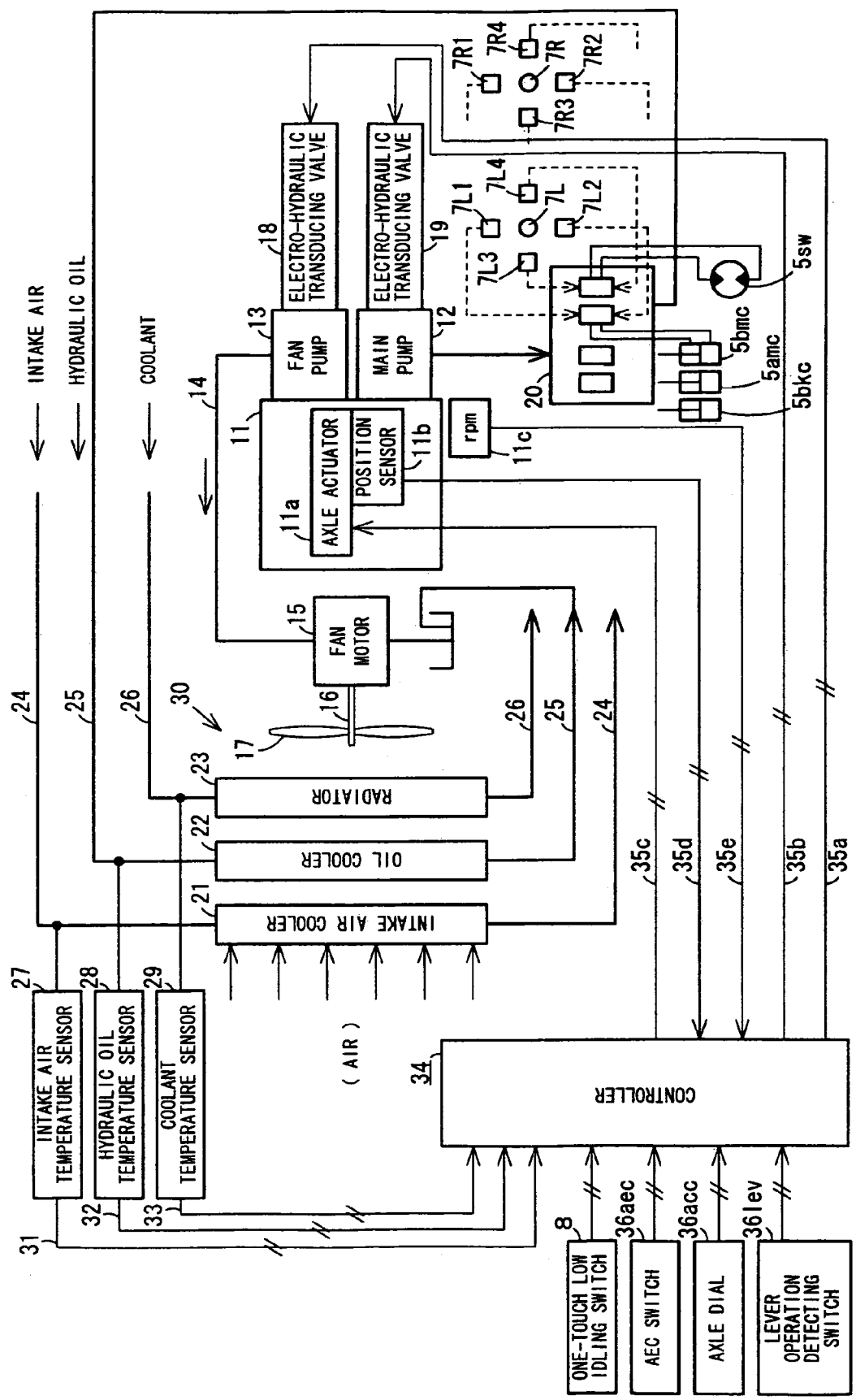
FIG. 2 is a block diagram of a control device for employing the aforementioned control method.

Next, an embodiment of the present invention is explained hereunder, referring to FIGS. 1 through 6.

FIG. 5 shows a hydraulic excavator as a work machine or a construction machine, which comprises an undercarriage 1 and an upper structure 2 rotatably mounted on the undercarriage 1. The upper structure 2 is provided with a power unit 3, a control valve unit (not shown), a cab 4, a working unit 5, and other necessary components. The power unit 3 is mainly comprised of a pump driving engine and hydraulic pumps driven by this engine. The control valve unit serves to control a hydraulic circuit. The hydraulic pumps serve as the pressurized oil source of the aforementioned hydraulic circuit. The cab 4 covers the space in which an operator performs operations.

A boom 5$bm$ is provided and adapted to be swung by boom hydraulic cylinders 5$bmc$. An arm 5$am$ is secured to the distal end of the boom 5$bm$ by a shaft and adapted to be swung by an arm hydraulic cylinder 5$amc$. A bucket 5$bk$ is secured to the distal end of the arm 5$am$ by a shaft and adapted to be swung by a bucket hydraulic cylinder 5$bkc$ through a bucket linkage 5$bl$. These components constitute the aforementioned working unit 5. The hydraulic cylinders mentioned above serve as hydraulic actuators.

Figure 6:
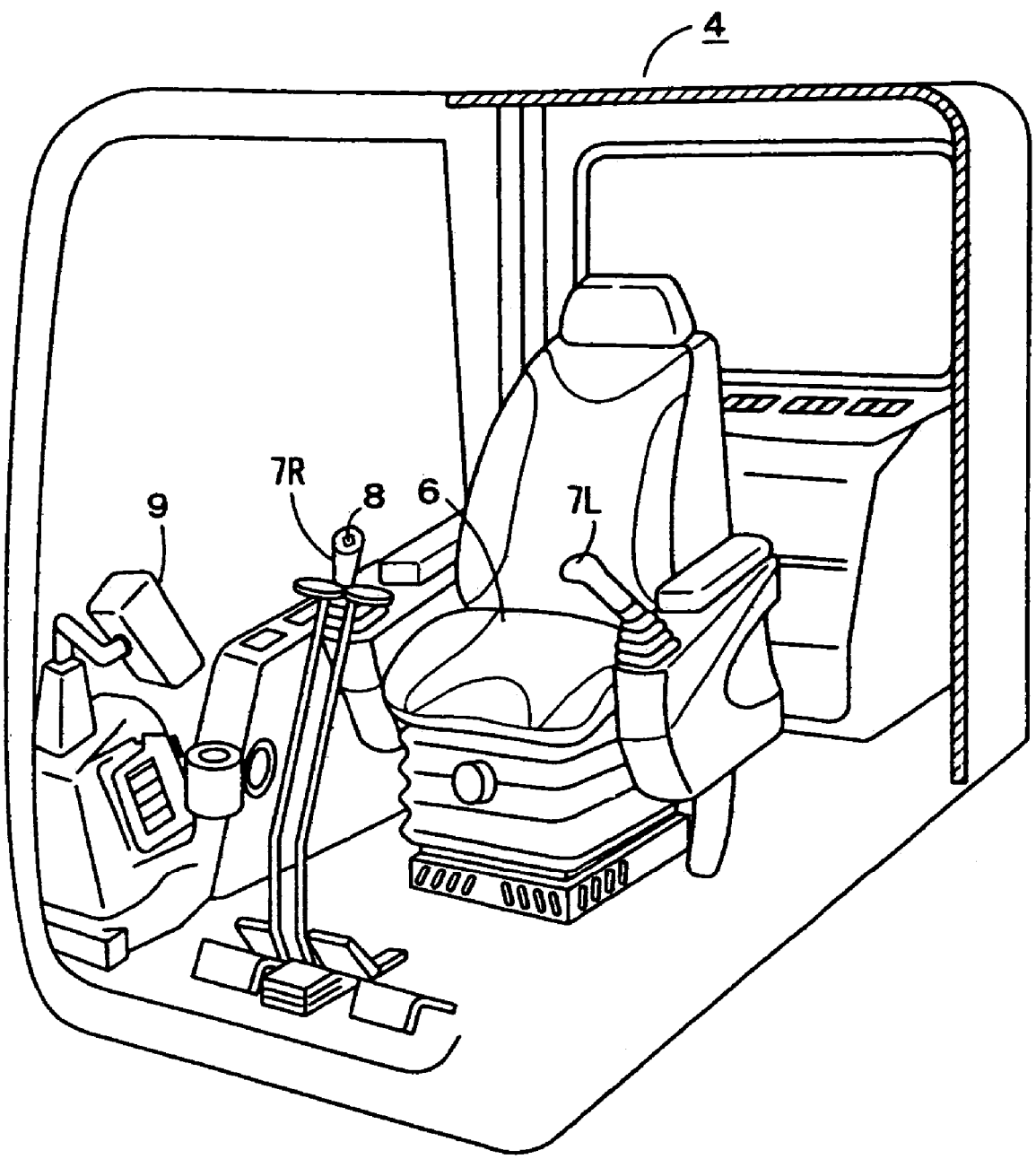
FIG. 6 is a perspective of the interior of a cab of the aforementioned hydraulic excavator.

FIG. 6 shows the interior of the aforementioned cab 4. Operation levers 7L,7R for performing excavation or other works are provided at both lateral sides of an operator's seat 6. A one-touch low idling switch 8 is provided on the upper end of one of the operation levers, i.e. the operation lever 7R, to enable the reduction of the revolution speed of the pump driving engine to a low-idling state by system of a single operation by the operator. A monitor 9 serving as a display device equipped with input capability is installed at the forward part of the cab interior.

FIG. 2 shows an outline of a fan revolution speed control device. The pump driving engine (hereinafter simply referred to as "engine") 11 is mounted on the motor vehicle of a construction machine, such as a hydraulic excavator. The engine 11 is provided with a main pump 12 for excavation or other work and a fan pump 13 and has a function of driving these pumps 12 and 13 together. The main pump 12 serves to feed hydraulic oil under pressure.

The main pump 12 serves to feed hydraulic fluid, i.e. hydraulic oil, to various hydraulic actuators, including hydraulic motors of the traveling system, a hydraulic rotating motor 5$sw$ for rotating the upper structure 2, and the hydraulic cylinders of the working unit, such as the boom hydraulic cylinders 5$bmc$, the arm hydraulic cylinder 5$amc$, and the bucket hydraulic cylinder 5$bkc$.

The fan pump 13 serves to drive a fan motor 15 by system of hydraulic fluid that is hydraulic oil discharged into a pipe line 14. The fan motor 15 is provided with a cooling fan 17, which is integrally attached to a rotary shaft 16 of the fan motor 15 so as to be rotated by the fan motor 15.

The fan pump 13 is provided with an electro-hydraulic transducing valve 18, which is adapted to receive electrical input signals and output hydraulic signals, so that the fan pump 13 functions as a variable delivery pump to perform variable control of the rotation speed of the fan motor 15 by changing the pump discharge rate of the fan pump 13 based on hydraulic signals output from the electro-hydraulic transducing valve 18.

The main pump 12 is provided with an electro-hydraulic transducing valve 19, which is adapted to receive electrical input signals and output hydraulic signals, so that the main pump 12 functions as a variable delivery pump to perform, based on hydraulic signals output from the electro-hydraulic transducing valve 19, variable control of the pump discharge rate of the hydraulic oil fed from the main pump 12 to a control valve 20.

The control valve 20 has a plurality of spools adapted to be pilot-operated by system of pressurized pilot oil fed from pilot valves 7L1-7L4,7R1-7R4, which are adapted to be the operation levers 7L,7R or foot pedals (not shown). The control valve 20 serves to control the direction and flow rate of the hydraulic oil that is fed from the main pump 12 through the aforementioned spools to the hydraulic actuators.

The cooling fan 17 is a part of a cooling system 30. In addition to the cooling fan 17, the cooling system 30 includes an intake air cooler 21, an oil cooler 22, and a radiator 23, which are sequentially disposed opposite and share the cooling fan 17. The intake air cooler 21, the oil cooler 22, and the radiator 23 are respectively provided with an intake air pipeline 24, a hydraulic oil pipeline 25, and a coolant pipeline 26.

The hydraulic oil pipeline 25 is a pipeline for returning the hydraulic oil from the hydraulic actuators through the control valve 20 into a tank. The oil cooler 22 serves to cool the return oil flowing in the hydraulic oil pipeline 25.

The intake air pipeline 24 is provided with an intake air temperature sensor 27 for detecting a temperature of the intake air, which is a cooling target fluid. The hydraulic oil pipeline 25 is provided with a hydraulic oil temperature sensor 28 for detecting a temperature of the hydraulic oil, which is another cooling target fluid. The coolant pipeline 26 is provided with a coolant temperature sensor 29 for detecting a temperature of the coolant (cooling water), which is yet another cooling target fluid. These temperature sensors 27,28,29 are connected to a signal input part of a controller 34 through respective input signal lines 31,32,33.

A signal output part of the controller 34 is connected to a signal input part of each electro-hydraulic transducing valve 18,19 mentioned above through each respective operation signal line 35a,35b.

The engine 11 is provided with an axle actuator 11a. Signals processed by the controller 34 are output as operation signals through a signal line 35c into the axle actuator 11a. The actual amount of operating performed by the axle actuator 11a is detected by a position sensor 11b. An engine revolution speed is detected by a revolution speed sensor 11c. These detected values are fed back to the controller 34, through signal lines 35d,35e respectively.

Other components connected to the controller 34, which serves to control the revolution speed of the engine 11 (hereinafter referred to as "engine speed"), mainly comprise the aforementioned one-touch low idling switch 8, an AEC switch 36aec, an axle dial 36acc, and lever operation detecting switches 36lev. The one-touch low idling switch 8 serves to activate the one-touch low idling system for reducing the engine speed to a low-idling state by system of a single operation by the operator. The AEC switch 36aec serves to activate an automatic engine speed control system (hereinafter referred to as "AEC") for automatically reducing the engine speed to a given, low revolution speed when the levers are at the neutral position. Each lever operation detecting switch 36lev serves to detect whether the corresponding operation lever 7L,7R is at the neutral position or an operative position. Each lever operation detecting switch 36lev performs this detection directly or indirectly through changes in pressure in the hydraulic circuit.

AEC is a system intended to automatically reduce the engine speed in order to save the fuel and reduce noises and vibrations when the operation levers 7L,7R are at the neutral position. There are two levels of AEC: a first-stage AEC and a second-stage AEC, which can be changed over by system of the AEC switch 36aec on a switch panel. For example, at the first-stage AEC, the engine speed may be reduced from a no-load speed by 100 rpm. At second-stage AEC, the engine speed may be reduced to a desired speed, e.g. 1300 rpm.

Should at least one of the operation levers 7L,7R be operated when AEC is on, the engine speed is automatically returned to a given revolution speed that has been set by the use of the axle dial 36acc beforehand.

The aforementioned one-touch low idling system is a system intended to reduce the engine speed to a given, low revolution speed, e.g. 1100 rpm, in order to save the fuel and reduce noises and vibrations in accordance with the intention of the operator. In other words, this system is activated by system of, for example, pushing the one-touch low idling switch 8 on the top of the right lever 7R when the operation levers 7L,7R are at the neutral position.

Should the one-touch low idling switch 8 be pushed again or either one or both of the operation levers 7L,7R be operated in the course of the one-touch low idling, the engine speed is returned to the previous speed that has been set by the axle dial 36acc.

The controller 34 is adapted to process signals representing the temperature data detected by the temperature sensors 27,28,29 and output signals for the electro-hydraulic transducing valve 18 to change the pump discharge rate of the fan pump 13 based on the signals output from the controller 34, thereby controlling the fan revolution speed of the cooling fan 17 in order to bring detected temperatures of the cooling target fluids, such as the intake air, the hydraulic oil, and the coolant, which are respectively detected by the temperature sensors 27,28,29, down to the same level as the predetermined respective target temperatures. The controller 34 thus cools the cooling target fluids appropriately to prevent overheating.

Figure 3:
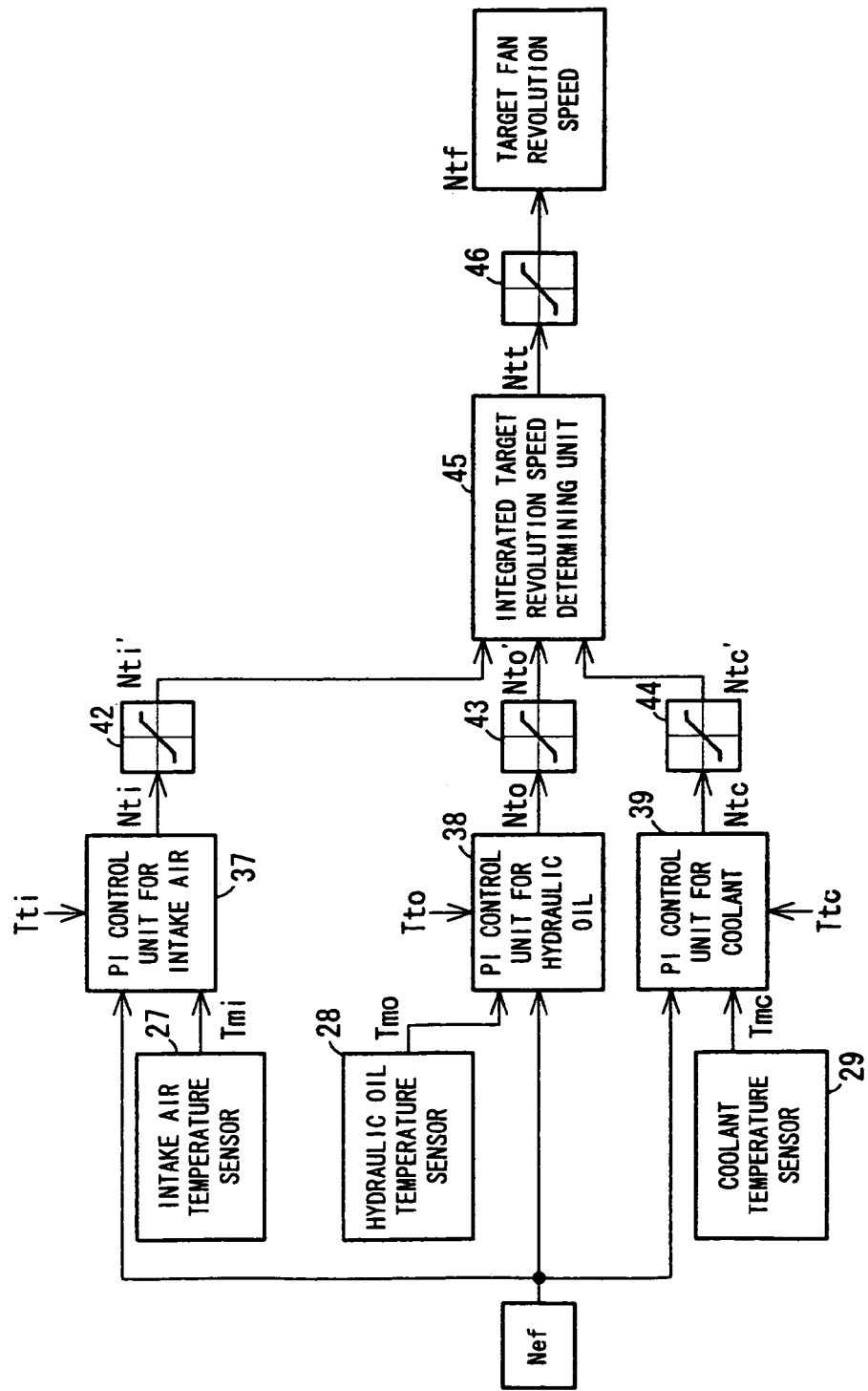
FIG. 3 is a block diagram showing an algorithm for the control method.

As shown in FIG. 3, the controller 34 has an algorithm to perform variable control of the fan revolution speed based on detected temperatures of the respective cooling target fluids.

Referring to FIG. 3, signals that represent various temperatures, i.e. a predetermined intake air target temperature Tti, a detected intake air temperature Tmi detected by the intake air temperature sensor 27, a predetermined hydraulic oil target temperature Tto, a detected hydraulic oil temperature Tmo detected by the hydraulic oil temperature sensor 28, a predetermined coolant target temperature Ttc, and a detected coolant temperature Tmc detected by the coolant temperature sensor 29, are input into their corresponding proportional integral control units, which are respectively provided for the different types of cooling target fluids. In the explanation hereunder, these proportional integral control units are referred to as PI control units 37,38,39.

The PI control units 37,38,39 serve to determine a plurality of target fan revolution speeds respectively for the various cooling target fluids, i.e. the intake air, the hydraulic oil, and the coolant, based on the calorific value and the ambient temperature of each respective cooling target fluid. Signals representing a target fan revolution speed Nti for the intake air, a target fan revolution speed Nto for the hydraulic oil, and a target fan revolution speed Ntc for the coolant, are output from the PI control units 37,38,39 respectively. Limiters 42,43,44 having saturation characteristics are provided so that each limiter 42,43,44 sets the upper and lower limits of each respective signal Nti,Nto,Ntc.

The target fan revolution speed Nti' for the intake air, the target fan revolution speed Nto' for the hydraulic oil, and the target fan revolution speed Ntc' for the coolant that have passed through the limiters 42,43,44 are input into an integrated target revolution speed determining unit 45, which determines a single integrated target revolution speed Ntt by performing calculation using these target fan revolution speeds.

The integrated target revolution speed determining unit 45 may perform the aforementioned calculation by, for example, squaring each target fan revolution speed Nti',Nto', Ntc' of each respective cooling target fluid, summing up the squared values, and calculating the root of the sum. The equation can be expressed as:

$$Ntt = \{\Sigma(\text{target fan revolution speed of each cooling target fluid } n)^2\}^{1/2} \text{ or}$$

$$Ntt = \{(Nti')^2 + (Nto')^2 + (Ntc')^2\}^{1/2}$$

Upon being passed through a limiter 46, which has saturation characteristics so as to set the upper and lower limits of each integrated target revolution speed Ntt, the integrated target revolution speed Ntt resulting from the calculation becomes the final target fan revolution speed Ntf.

As described above, the cooling system 30 consists of the intake air cooler 21, the oil cooler 22, the radiator 23, and the cooling fan 17 shared by these three components. The controller 34 is programmed to control the fan revolution speed of the cooling fan 17 of the cooling system 30 in order to achieve the target fan revolution speed Ntf so that the detected temperature of each cooling target fluid, i.e. the intake air, the hydraulic oil, or the coolant, passing through the cooling system 30, i.e. the intake air cooler 21, the oil cooler 22, or the radiator 23, is brought to the same level as each respective target temperature when the flow rate of the cooling target fluid is high. The controller 34 is also programmed to control the fan revolution speed of the cooling fan 17 to achieve a new target fan revolution speed Ntfnew, which is lower than the target fan revolution speed Ntf, should the flow rate of a cooling target fluid passing through the cooling system 30 become lower.

Whether the flow rate of the cooling target fluid passing through the cooling system 30 is high or low is detected by system of the lever operation detecting switches 36*lev*. To be more specific, should the lever operation detecting switches 36lev detect activation of either one or both of the operation levers 7L,7R, it is judged that each cooling target fluid is passing through the cooling system 30 at a high flow rate. Should the operation levers 7L,7R be detected to be at the neutral position, it is judged that the cooling target fluid is passing through the cooling system 30 at a low flow rate.

When outputting a command for reducing the engine speed of the engine 11 in cases where the levers are at the neutral position in order to bring the engine speed to a level lower than in a case where either one or both of the levers are being operated, the controller 34 calculates a new target fan revolution speed Ntfnew for the period during which the levers are at the neutral position by multiplying the fan revolution speed Ntf at that time by the ratio (Ncoe/Nhie), in which Ncoe represents the engine speed when the levers are at the neutral position and Nhie represents the engine speed when at least one of the levers is operated.

FIG. 4 shows in detail the aforementioned PI control unit 38 for temperature of the hydraulic oil.

Referring to the drawing, a target temperature Tto and a detected temperature Tmo of the hydraulic oil are introduced to a comparator 51, which serves to calculate the difference between these temperatures. A signal value is produced by multiplying a differential signal output from the comparator 51 by a gain 52 and then setting the upper and lower limits of the resulting value by system of a limiter 53, which has saturation characteristics. Another signal value is produced by multiplying the aforementioned differential signal by a gain 54, performing integration of the resulting value by system of an integrator 55, and then setting the upper and lower limits of the resulting value by system of a limiter 53. By summing up the aforementioned signal values and an expected fan revolution speed Nef by system of an adder 57, the aforementioned target fan revolution speed Nto for the hydraulic oil is determined.

When either one or both of the levers that serve to feed hydraulic oil to the hydraulic actuators, such as the boom hydraulic cylinders 5*bmc*, are operated, the fan revolution speed of the oil cooler 22, which serves to cool the return oil from the hydraulic actuators by system of the cooling fan 17, is controlled to achieve the target fan revolution speed Nto for the hydraulic oil so that the detected temperature Tmo of the hydraulic oil reaches the target temperature Tto. When the operation levers are at the neutral position, supply of the hydraulic oil to the hydraulic actuators is at standstill, and the fan revolution speed of the cooling fan is controlled at a new target fan revolution speed Ntonew, which is lower than the target fan revolution speed Nto.

When outputting a command for reducing the engine speed of the engine 11 in cases where the levers are at the neutral position in order to bring the engine speed to a level lower than in a case where either one or both of the levers are being operated, the controller 34 calculates a new target fan revolution speed Ntonew for the period during which the levers are at the neutral position by multiplying the current fan revolution speed Nto for the hydraulic oil by the ratio of the engine speed Ncoe to the engine speed Nhie, wherein Ncoe represents the engine speed when the levers are at the neutral position and Nhie represents the engine speed when at least one of the levers is operated.

In the same manner as above, the PI control unit 37 processes a target temperature Tti and a detected temperature Tmi of the intake air to determine a target fan revolution speed Nti for the intake air, and the PI control unit 39 processes a target temperature Ttc and a detected temperature Tmc of the coolant to determine a target fan revolution speed Ntc for the coolant. In addition, new target fan revolution speeds for the intake air and the coolant are respectively determined.

To summarize, the fan revolution speed control method according to the present invention is a control method for calculating either an overall target revolution speed Ntf as shown in FIG. 3 or individual target revolution speeds, such as a target fan revolution speed Nto for hydraulic oil, as shown in FIG. 4, and reducing the calculated target revolution speed Ntf or each respective target revolution speed Nti,Nto,Ntc to achieve the ratio Ncoe/Nhie, in which Ncoe represents the engine speed when the levers are at the neutral position and Nhie represents the engine speed when at least one of the levers is operated.

The state where the operation levers 7L,7R are at the neutral position and the engine speed is automatically reduced to the AEC revolution speed as a result of activation of AEC by system of the AEC switch 36*aec* is referred to as AEC status-ON. The state where the operation levers 7L,7R are at the neutral position and the engine speed is manually reduced to the one-touch low idling revolution speed as a result of activation of one-touch low idling by system of the one-touch low idling switch 8 is referred to as one-touch low idling status-ON.

The engine speed when the levers are at the neutral position, i.e. the engine speed Ncoe, is a command value output from the controller 34 as the AEC revolution speed or the one-touch low idling revolution speed. The engine speed when at least one of the levers is in operation, i.e. the engine speed Nhie, is a high idling speed set by system of the axel dial 36*acc*.

Next, the functions of the embodiment shown in the drawings are explained hereunder.

Each PI control unit 37,38,39 includes a comparator 51 and other necessary components. The temperatures of the cooling target fluids, i.e. the intake air, the hydraulic oil, and the coolant, are respectively detected by the temperature sensors 28,28,29. As shown in FIGS. 3 and 4, based on data of these temperatures of the cooling target fluids, a target fan revolution speed Ntf is obtained by system of the PI control units 37,38,39, the limiter 46, etc. The revolution speed of the cooling fan 17 is controlled to achieve the target fan revolution speed Ntf so that the detected temperature of each cooling target fluid reaches each respective target temperature.

To be more specific, information of the temperatures of the cooling target fluids detected by the temperature sensors 28,28,29 is constantly or periodically fed back to calculation of fan revolution speeds so that in cases where the detected temperature of any cooling target fluid from among the intake air, the hydraulic oil, and the coolant is higher than its corresponding target temperature, the target fan revolution speed Ntf is increased based on the difference in temperature so as to achieve a better cooling effect. Thus, the fan revolution speed is controlled without using a revolution speed sensor.

Should the calorific value of a cooling target fluid increase, the corresponding PI control unit 37,38,39 functions so that a higher fan revolution speed is required for the temperature detected by the corresponding temperature sensor 27,28,29 to reach the preset target temperature.

For example, in cases where the target temperature and the detected temperature of the hydraulic oil are 60° C. and 61° C. respectively, the fan revolution speed of the cooling fan 17 begins to increase so that the detected temperature is brought down to 60° C. If the calorific value is very small, a minimal increase in the fan revolution speed is sufficient for the detected temperature to return to 60° C. Should the calorific value be great, a minimal increase in the fan revolution speed is not sufficient to stop the increase in the temperature of the hydraulic oil. As a result, the fan revolution speed, too, continues to increase. When the fan revolution speed eventually reaches a sufficient level, the temperature of the hydraulic oil starts to decrease. The increase in the fan revolution speed stops when the temperature of the hydraulic oil reaches the target temperature.

Furthermore, even if the conditions of the target temperature and the calorific value are the same, an increase in an ambient temperature results in a higher fan revolution speed of the cooling fan 17 as described previously.

As explained above, a value to which the fan revolution speed is controlled is determined based on the calorific value and the ambient temperature of each respective cooling target fluid. In other words, a feature of the control method according to the present embodiment lies in the absence of a map specifying each temperature and its corresponding fan revolution speeds.

In cases where the integrated target revolution speed determining unit 45 calculates an integrated target revolution speed Ntt based on the equation Ntt=$\{\Sigma(\text{target fan revolution speed of each cooling target fluid n})^2\}^{1/2}$, the integrated target revolution speed Ntt inevitably increases, when the fan revolution speed of any cooling target fluid increases.

For example, when the target revolution speeds determined based on the temperatures of the intake air, the coolant (cooling water), and the hydraulic oil are 300 rpm, 500 rpm, and 700 rpm respectively, the integrated target revolution speed Ntt is 911 rpm. Under these conditions, when the target revolution speed determined by the coolant temperature increases from 500 rpm to 600 rpm, the integrated target revolution speed Ntt becomes 970 rpm.

Should the integrated target revolution speed be determined from the equation of Integrated target revolution speed=Maximum value (Fan revolution speed of cooling target fluid n), the integrated target revolution speed is 700 rpm regardless of whether the target revolution speed determined by the coolant temperature is 500 rpm or 600 rpm. In other words, the integrated target revolution speed remains unchanged regardless of the increasing calorific value of the entire system.

In cases where the hydraulic oil used in a vehicle, such as a hydraulic excavator, is cool and does not require reduction of the temperature, the electro-hydraulic transducing valve 18 reduces the flow rate of the hydraulic oil discharged from the fan pump 13 in order to reduce the fan revolution speed of the cooling fan 17. At that time, as the fan driving power of the engine 11 required by the fan pump 13 has decreased, the output of the main pump 12, which, too, is driven by the engine 11, can be increased by an equivalent proportion. The method described above thus enables the effective use of the output of the engine 11. Furthermore, the decrease in the fan revolution speed reduces noises of the cooling fan 17.

Next, the procedure of the fan revolution speed control method is sequentially explained.

(1) The temperatures of the intake air, the hydraulic oil, and the coolant (cooling water) of the engine 11 are respectively detected by the temperature sensors 27,28,29.

(2) The difference between the target temperature of each cooling target fluid, which is set in the controller 34 beforehand, and its corresponding detected temperature detected by each respective temperature sensor 27,28,29 is calculated by the comparator 51 of the corresponding PI control unit 37,38,39. Then, proportional integral control is performed on each calculated difference by using the gains 52,54 and the integrator 55.

(3) As a result of the PI control described above, the target fan revolution speeds Nti,Nto,Ntc of the respective cooling target fluids are determined. With these target fan revolution speeds input through the limiters 42,43,44, the target fan revolution speeds Nti',Nto',Ntc' are determined.

(4) The integrated target revolution speed determining unit 45 determines a single integrated target revolution speed Ntt from the plurality of target fan revolution speeds Nti',Nto',Ntc'. To be more specific, according to the present embodiment, the integrated target revolution speed is determined by calculation that uses the equation Ntt=$\{\Sigma(\text{target fan revolution speed of each cooling target fluid n})^2\}^{1/2}$. As described later, however, the method of calculation is not limited to this equation.

With the integrated target revolution speed Ntt input through the limiter 46, the final target fan revolution speed Ntf is determined.

(5) By driving the electro-hydraulic transducing valve 18 so as to achieve the target fan revolution speed Ntf, the controller 34 controls the pump discharge rate of the fan pump 13, thereby controlling the number of revolutions of the fan motor 15. Thus, the fan revolution speed of the cooling fan 17 is controlled.

(6) In order for the detected temperatures of the cooling target fluids to reach the respective target temperature, the process returns to (2) described above and continues feedback control.

(7) When at least one of the levers is being operated or in any other situation where a large volume of a cooling target fluid or fluids passes through the control system 30, which is provided with the cooling fan 17 for cooling the cooling target fluids, the fan revolution speed of the cooling fan 17 of the cooling system 30 is controlled to achieve the target fan revolution speed Ntf so that the detected temperature Tmi,Tmo,Tmc of each cooling target fluid reaches each respective target temperature Tti,Tto,Ttc set beforehand. Should the flow rate of a cooling target fluid or fluids passing through the control system 30 be reduced, such as when the levers are moved to the neutral position, the fan revolution speed of the cooling fan 17 is controlled to achieve the new target fan revolution speed Ntfnew, which is lower than the target fan revolution speed Ntf.

For example, when either one or both of the levers that serve to feed hydraulic oil to the hydraulic actuators are operated, the fan revolution speed of the oil cooler 22, which serves to cool the return oil from the hydraulic actuators by system of the cooling fan 17, is controlled to achieve the target fan revolution speed Nto for the hydraulic oil so that the detected temperature Tmo of the hydraulic oil in the hydraulic circuit reaches the target temperature Tto. When the operation levers are at the neutral position, supply of the hydraulic oil to the hydraulic actuators is at standstill, and the fan revolution speed of the cooling fan is controlled at a new target fan revolution speed Ntonew, which is lower than the target fan revolution speed Nto.

As described above, when reducing the engine speed of the engine 11 in cases where the levers are at the neutral position in order to bring the engine speed to a level lower than in a case where either one or both of the levers are being operated, a new target fan revolution speed Ntonew or Ntonew for the period during which the levers are at the neutral position is calculated by multiplying the fan revolution speed Ntf or Nto at that time by the ratio Ncoe/Nhie, wherein Ncoe represents the engine speed when the levers are at the neutral position and Nhie represents the engine speed when at least one of the levers is operated.

As described above, the fan revolution speed control method according to the invention does not call for detecting a fan revolution speed by system of a revolution speed sensor or the like to perform feedback control of the fan revolution speed. As it calls for feedback of temperatures detected by the temperature sensors 27-29 for the respective cooling target fluids, the fan revolution speed in an absolute value is not important.

As the value at which the fan revolution speed of each cooling target fluid is regulated varies depending on the calorific value and the ambient temperature of the cooling target fluid, target fan revolution speeds are respectively set for the cooling target fluids, and a calculating method for determining a single integrated target revolution speed based on these target fan revolution speeds is provided.

When the temperature of a cooling target fluid is low, the fan revolution speed is reduced so that the power required to drive the fan is reduced. Therefore, the hydraulic output of the main pump can be increased by the equivalent amount.

As control is performed to bring the detected temperatures of the cooling target fluids to reach the respective target temperatures, the temperatures of the hydraulic oil and the cooling water rise faster in winter. When the temperature of such a cooling target fluid as hydraulic oil changes, its viscosity, too, fluctuates. Therefore, the faster the rise in the temperature of the cooling target fluid, the faster its viscosity becomes stable. As a result, the fluctuation in the responding time caused by the difference in the viscosity of the cooling target fluid, such as the hydraulic oil, is limited to a minimum, enabling the engine 11 to function at a more stable temperature.

The above description that states "control is performed so as to bring the detected temperatures of the cooling target fluids to reach the respective target temperatures" includes cases where the cooling fan is brought to a standstill or driven at a minimum fan revolution speed by controlling the discharge rate of the fan pump 13 to achieve 0 or a minimum amount by system of the electro-hydraulic transducing valve 18 immediately after start-up of the engine in winter or under other similar conditions.

Should the flow rate of a cooling target fluid or fluids passing through the control system 30 be reduced, the fan revolution speed of the cooling fan 17 is controlled to achieve the new target fan revolution speed Ntfnew, which is lower than the target fan revolution speed Ntf. As this prevents rapid cooling of the cooling target fluid(s) flowing in the cooling system 30 at a reduced flow rate and thereby suppress occurrence of thermal strain in the cooling system, the durability of the cooling system 30 is improved.

For example, even when the hydraulic oil flowing in the oil cooler 22 at a reduced flow rate as a result of operating the levers to the neutral position, reduction of the new target fan revolution speed Ntonew for the period during which the levers are at the neutral position prevents the hydraulic oil from being cooled rapidly so that occurrence of thermal strain in the oil cooler 22 is suppressed, resulting in the improved durability of the oil cooler 22.

At that time, when the levers are at the neutral position, the new target fan revolution speed Ntfnew or Ntonew for the period during which the levers are at the neutral position is calculated by reducing the target fan revolution speed Ntf or Nto to achieve the ratio Ncoe/Nhie, in which Ncoe represents the engine speed when the levers are at the neutral position and Nhie represents the engine speed when at least one of the levers is operated. Therefore, the fan revolution speed is reduced to the optimal level without the problem of excessive reduction of the fan revolution speed.

The method of calculation for the integrated target revolution speed determining unit 45 to determine an integrated target revolution speed Ntt is not limited to the one described above.

For example, the calculation may be performed by using a weighting factor Wn ($0 \leq Wn \leq 1$, $\Sigma Wn=1$) in the equation:

Integrated target revolution speed $Ntt = \Sigma \{Wn \times (\text{target fan revolution speed of cooling target fluid } n)\}$ The proportional integral control units that can be used for the invention are not limited to the PI control units 37,38,39 described above and include proportional integral and differential control units (PID control units), which are widely used. Normal PID control units can be used without a problem.

Referring to the flow chart shown in FIG. 1, an explanation is given hereunder of the fan revolution speed control method that calls for reducing the fan revolution speed so as to suppress occurrence of thermal strain in the oil cooler when the levers are at the neutral position. In FIG. 1, numerals enclosed with circles represent step numbers.

The controller 34 regards the state where the AEC is in operation as AEC status-ON and the state where engine is at the one-touch low idling revolution speed as a result of operation of the one-touch low idling switch 8 as one-touch low idling status-ON. The controller 34 determines whether the AEC status has become ON as a result of operating the levers to the neutral position (Step 1). The controller 34 also determines whether the one-touch low idling status has become ON as a result of the operating the levers to the neutral position (Step 2). Should neither be the case, in other words when at least one of the operation levers 7L,7R has been operated, the controller 34 commands the electro-hydraulic transducing valve 18 the fan revolution speed Ntf (Step 3).

Upon ascertaining whether the status is AEC status-ON or one-touch low idling status-ON, the controller 34 initiates fan revolution speed reduction control, which calls for calculating a new target fan revolution speed Ntfnew for the period during which the levers are at the neutral position by multiplying the fan revolution speed Ntf at that time by the ratio of the engine speed Ncoe to the high-idling engine speed Nhie, in which the engine speed Ncoe serves as the target speed when the levers are at the neutral position and the high-idling engine speed Nhie is the engine speed when at least one of the levers is operated. The controller 34 then outputs the calculated target fan revolution speed Ntfnew as a command to the electro-hydraulic transducing valve 18 (Step 4).

When the levers are at the neutral position, the high-idling engine speed Nhie set by system of the axel dial 36*acc* is reduced to the engine speed Ncoe, which is the engine speed for the period during which the status is AEC status-ON or one-touch low idling status-ON. In Step 4 described above, the fan revolution speed Ntf is reduced to the new target fan revolution speed Ntfnew so as to achieve the ratio of the engine speed Ncoe to the high-idling engine speed Nhie.

Reducing the target fan revolution speed Ntf for the period during which the levers are at the neutral position to the new target fan revolution speed Ntfnew in the manner described above prevents rapid cooling of the hydraulic oil in the oil cooler 22, thereby suppressing occurrence of thermal strain in the oil cooler 22.

Reducing the fan revolution speed Ntf so as to achieve the ratio Ncoe/Nhie of the engine speed, wherein Ncoe represents the engine speed for the period during which the status is AEC status-ON or one-touch low idling status-ON prevents excessive reduction of the fan revolution speed and enables the reduction of the fan revolution speed to the optimal level.

The results offered by the fan revolution speed control method described above include the following.

Thermal strain does not occur in the oil cooler 22 when the levers are at the neutral position. Therefore, the durability of the oil cooler 22 is improved.

As the fan revolution speed is reduced, the amount of fuel consumed due to revolution of the cooling fan is reduced, resulting in better fuel efficiency.

As the fan revolution speed is lower when the levers are at the neutral position, noise produced by the revolution of the fan is reduced, alleviating discomfort for an operator.

As the fan revolution speed is lower when the levers are at the neutral position, vibration produced by the revolution of the fan is reduced, resulting in the improved durability of the components.

ACTUAL EXAMPLE 1

Next, the present invention is explained using specific values, referring to a case where the invention is applied to a large hydraulic excavator, for example an 85t-class hydraulic excavator. When AEC is in the second stage with the levers of the hydraulic excavator at the neutral position, the engine speed commanded by the controller 34 is 1300 rpm, and the high-idling engine speed is 1980 rpm. Therefore, the new target fan revolution speed Ntfnew is calculated by reducing the target fan revolution speed Ntf that corresponds to the temperature at that time to achieve the ratio of 1300/1980. The fan revolution speed is controlled to achieve the new target fan revolution speed Ntfnew.

In cases where AEC is in the first stage when the levers are at the neutral position, the engine speed commanded by the controller 34 is 100 rpm lower than the value set by the axle dial 36*acc*. The new target fan revolution speed Ntfnew is calculated by reducing the target fan revolution speed Ntf that corresponds to the temperature at that time to achieve the ratio of the aforementioned commanded engine speed to the high-idling engine speed. The fan revolution speed is controlled in accordance with the new target fan revolution speed Ntfnew.

When the engine is in the one-touch low idling state, the high-idling engine speed of 1980 rpm is reduced to the low-idling engine speed of 1100 rpm. Therefore, the new target fan revolution speed Ntfnew is calculated by reducing the target fan revolution speed Ntf that corresponds to the temperature at that time to achieve the ratio of 1100/1980. The fan revolution speed is controlled in accordance with the new target fan revolution speed Ntfnew.

POSSIBLE INDUSTRIAL APPLICATION

The present invention is applicable to not only a construction machine, such as a hydraulic excavator, but also any other work machine that requires control of the fan revolution speed of its cooling fan.

The invention claimed is:

1. A fan revolution speed control method comprising steps of:
   detecting a temperature of a cooling target fluid, and
   controlling the fan revolution speed of a cooling fan of a cooling system for cooling said cooling target fluid so that:
      when the flow rate of said cooling target fluid passing through said cooling system is high, the fan revolution speed of said cooling fan is controlled to achieve a target fan revolution speed in order to bring the detected temperature to the same level as a preset target temperature, and that when the flow rate of said cooling target fluid becomes lower, the fan revolution speed of the cooling fan is controlled to achieve a new target fan revolution speed that is lower than said target fan revolution speed.

2. A fan revolution speed control method comprising steps of:
   detecting a temperature of hydraulic oil in a hydraulic circuit, and
   controlling the fan revolution speed of a cooling fan of an oil cooler that serves to cool the return oil from a hydraulic actuator so that:
      when a lever for feeding hydraulic oil to said hydraulic actuator is being operated, the fan revolution speed of said cooling fan is controlled to achieve a target fan revolution speed in order to bring the detected temperature to the same level as a preset target temperature, and that when the lever is at a neutral position, during which period supply of the hydraulic oil to said hydraulic actuator is at standstill, the fan revolution speed of said cooling fan is brought to a new target fan revolution speed that is lower than said target fan revolution speed.

3. A fan revolution speed control method as claimed in claim 2, wherein:
   when reducing the engine speed of a pump driving engine in the hydraulic circuit for the period during which said lever is at said neutral position to a level lower than that for the period during which said lever is being operated, said new target fan revolution speed for the period during which said lever is at the neutral position is calculated by multiplying the fan revolution speed at that time by the ratio of the engine speed for the period during which said lever is at the neutral position to the engine speed for the period during which said lever is being operated.

* * * * *